United States Patent [19]

Wang

[11] Patent Number: 5,642,204
[45] Date of Patent: Jun. 24, 1997

[54] ERROR DIFFUSION METHOD

[75] Inventor: Te-Mei Wang, Miao Li, Taiwan

[73] Assignee: Industrial Technology Research Institute, Taiwan

[21] Appl. No.: 479,870

[22] Filed: Jun. 7, 1995

Related U.S. Application Data

[63] Continuation of Ser. No. 984,911, Dec. 2, 1992.

[51] Int. Cl.$^6$ ............... H04N 1/40; H04N 1/21; H04N 1/38; H04N 1/46
[52] U.S. Cl. ............ 358/455; 358/447; 358/298; 358/456; 358/457; 358/463; 358/532; 358/448; 358/453; 382/272; 382/273
[58] Field of Search ............... 358/455, 447, 358/298, 456, 457, 463, 532, 448, 453; 382/272, 273

[56] References Cited

U.S. PATENT DOCUMENTS

| | | |
|---|---|---|
| 4,411,015 | 10/1983 | Scherl et al. |
| 4,449,150 | 5/1984 | Kato . |
| 4,501,016 | 2/1985 | Persoon et al. ............ 382/272 |
| 4,953,013 | 8/1990 | Tsuji et al. ................ 358/453 |
| 4,958,238 | 9/1990 | Katayama et al. |
| 4,975,786 | 12/1990 | Katayam et al. |
| 5,034,990 | 7/1991 | Klees . |
| 5,073,953 | 12/1991 | Westdijk . |
| 5,101,438 | 3/1992 | Kanda ..................... 382/9 |
| 5,131,059 | 7/1992 | Kobayashi ............... 382/50 |
| 5,267,330 | 11/1993 | Masuda ................... 382/51 |

OTHER PUBLICATIONS

"An Adaptive Algorithm for Spatial Grey Scale", Robert Floyd and Louis Steinberg, *SID International Symposium Digest of Technical Papers*, pp. 36–37, 1975.

"Digital Halftoning", Robert Ulichney, published by MIT Press, pp. 10–13, 1987.

"Block Segmentation and Text Extraction in Mixed Text/Image Documents", Friedrich M. wahl, Kwan Y. Wong, and Richard G. Casey, *Computer Graphics and Image Processing*, vol. 20,. pp. 375–390, 1982.

*Primary Examiner*—Edward L. Coles, Sr.
*Assistant Examiner*—Tia M. Harris
*Attorney, Agent, or Firm*—Merchant, Gould, Smith, Edell, Welter & Schmidt, P.A.

[57] ABSTRACT

An improved error diffusion method for incorporating into a halftoning algorithm for processing gray scale images to counterpart binary images. The improved error diffusion method adopts a tone scale function to process the input gray scale image before proceeding with the halftoning (error diffusion) processing in order to improve the image darkening problem caused by the conventional error diffusion method and a noise correction process to eliminate the background noises resulted from the accumulated error of the conventional error diffusion method. The proceeding of the tone scaling process and the halftoning process are parallel with the correction process so that errors generated in either one will not affect the other.

4 Claims, 8 Drawing Sheets

NMA MICROFONT QJKLPYZ
6BSI2GH5D4X7U3W8V9E
PQR45DE9UV670FG8STHIJNOWXABYZ
3KLM12C

ABCDEFGHIJKLMNOPQRSTUVW
XYZabcdefghijklmnopqrst
uvwxyz0123456789 OCR-B

ABCDEFGHIJKLMNOPQRSTUV
WXYZabcdefghijklmnopqr
stuvwxyz1234567890PICA

ABCDEFGHIJKLMNOPQRSTUVWXYZ
abcdefghijklmnopqrstuvwxyz
1234567890 Elite

ABCDEFGHIJKLMNOPQRSTUVWXYZ
abcdefghijklmnopqrstuvwxyz
1234567890 Spartan Medium 6 pt ABCDEFGHIJKLMNOPQRSTUVWXYZ
abcdefghijklmnopqrstuvwxyz
1234567890 Spartan Medium 8 pt

FIG.8(a)

NMA MICROFONT QJKLPYZ
6BSI2GH5D4X7U3W8V9E
PQR45DE9UV670FG8STHIJNOWXABYZ
3KLM12C

ABCDEFGHIJKLMNOPQRSTUVW
XYZabcdefghijklmnopqrst
uvwxyz0123456789 OCR-B

ABCDEFGHIJKLMNOPQRSTUV
WXYZabcdefghijklmnopqr
stuvwxyz1234567890PICA

ABCDEFGHIJKLMNOPQRSTUVWXYZ
abcdefghijklmnopqrstuvwxyz
1234567890 Elite

ABCDEFGHIJKLMNOPQRSTUVWXYZ
abcdefghijklmnopqrstuvwxyz
1234567890 Spartan Medium 6 pt ABCDEFGHIJKLMNOPQRSTUVWXYZ
abcdefghijklmnopqrstuvwxyz
1234567890 Spartan Medium 8 pt

FIG.8(b)

ERROR DIFFUSION METHOD

This is a File Wrapper Continuation application of application Ser. No. 07/984,911, filed Dec. 2, 1992.

FIELD OF THE INVENTION

The present invention relates generally to an error diffusion method used to print documents containing images of multiple gray levels, usually referred to as gray scale images, through a binary-valued printing machine and in particular to an algorithm which processes an image in a parallel fashion so as to eliminate the shortcoming of the conventional error diffusion method.

BACKGROUND OF THE INVENTION

Most printers are exclusively binary in nature. In such apparatus, a binary one typically represents a black dot and a binary zero is a white dot, namely a blank. However, images obtained with scanning devices, such as a scanner, are generally non-binary gray scale images, namely containing pixel data of non-binary type, but multi-valued. Taking mono-scanning device as an example, if a pixel of a scan-in image is to be represented by 8 bits, then the pixel may have a value selected from one of $2^8=256$ gray levels. In other words, the image is digitized into 256 gray levels by the scanning device, the lowest level, 0, being generally the darkest level, while the highest level, 255, is the lightest. In that case, the gray scale image so obtained cannot be printed directly with the binary printers for the non-binary data type of the image is inconsistent with the binary characteristic of the printer. An algorithm must be adopted to convert the gray scale image into a counterpart binary one and thus having a printing of variable shading. Such an algorithm is generally known as halftoning.

The halftoning technique has been widely discussed in the textbook "DIGITAL HALFTONING" of Robert Ulichney, published by MIT Press. in 1987. One of the halftoning techniques is proposed by Robert Floyd and Louis Steinberg in their paper "An Adaptive Algorithm for Spatial Gray Scale", SID INTERNATIONAL SYMPOSIUM DIGEST OF TECHNICAL PAPERS, pp. 36–37, 1975, which is generally called the error diffusion method and an illustrative processing algorithm of which is:

```
for i := 1 to m do
    for j := 1 to n do
        begin
            if A[i,j] < thresh then B[i,j] := 0
            else B[i,j] := 1;
            error := A[i,j] – B[i,j];
            A[i,j + 1] := A[i,j + 1] + error*alpha;
            A[i + 1,j – 1] := A[i + 1,j – 1] + error*beta;
            A[i + 1,j] := A[i + 1,j] + error*gamma;
            A[i + 1,j + 1] := A[i + 1,j + 1] + error*delta;
        end.
``` where A[i,j] is the element of an m×n original gray scale image array in which intensity values are between 0 and 1, B[i,j] is the element of an m×n binarized image array in which intensity values are either 0 or 1 (0 indicating a black dot and 1 a blank), thresh is the binarization threshold, and alpha, beta, gamma, and delta are weighting factors. The suggested values of these weighting factors by Floyd and Steinberg are: alpha 7/16, beta 3/16, gamma 5/16, and delta 1/16. It should be noted that the sum of these factors should be equal to one to give a zero overall error.

The disadvantages of the conventional error diffusion method include (1) the printed image is too dark to distinguish the details thereof, especially for the portion with lower gray level values and (2) the white background of the printed image is disturbed by snake-like noises.

Some patents try to overcome these disadvantages of error diffusion, such as U.S. Pat. Nos. 4,449,150 and 4,975,786. In U.S. Pat. No. 4,449,150, a random number is generated to be the threshold of the error diffusion. This avoids excessive dispersion of high frequency components in output pictures. In U.S. Pat. No. 4,975,786, a threshold value is set. When the pixel concentration is smaller than the threshold value, the error data generated for that pixel is set to 0, with the result that particles-like noises in the high contrast portion are eliminated and the encoding efficiency in highlight portions is improved.

To overcome the drawback of darkening, Robert Ulichney proposes in his book "DIGITAL HALFTONING" (pp. 11–13) a method to adjust the tone scale of the printed image which however enhances the contrast of the image only and not effectively improve the darkening problem.

OBJECTS OF THE INVENTION

It is therefore a primary object of the present invention to provide an improved error diffusion method which adopts a tone scale function to brighten the darker portions of a printed image and thus improving the darkening problem of printings.

It is also an object of the present invention to provide an improved error diffusion method comprising a correction process which corrects the gray levels which are mis-modified by error diffusion method to be correspondent to the original gray levels in order to eliminate the snake-like noises resulted from the cumulative error diffusion effects.

To achieve the above-mentioned objects, there is provided an improved error diffusion method for incorporating into a halftoning algorithm for processing gray scale images to counterpart binary images. The improved error diffusion method adopts a tone scale function to process the input gray scale image before proceeding with the halftoning (error diffusion) processing in order to improve the image darkening problem caused by the conventional error diffusion method and a noise correction process to eliminate the background noises resulted from the accumulated error of the conventional error diffusion method. The proceeding of the tone scaling process and the halftoning process are parallel with the correction process so that errors generated in either one will not affect the other.

Other objects and advantages of the invention will be apparent from the following description of the present method, reference being made to the accompanying drawings wherein:

BRIEF DESCRIPTION OF THE DRAWINGS

FIGS. 8a and 8b respectively show a text output printed with the conventional error diffusion method and the improved error diffusion method of the present invention.

DETAILED DESCRIPTION OF THE PREFERRED EMBODIMENT

Figure 1:
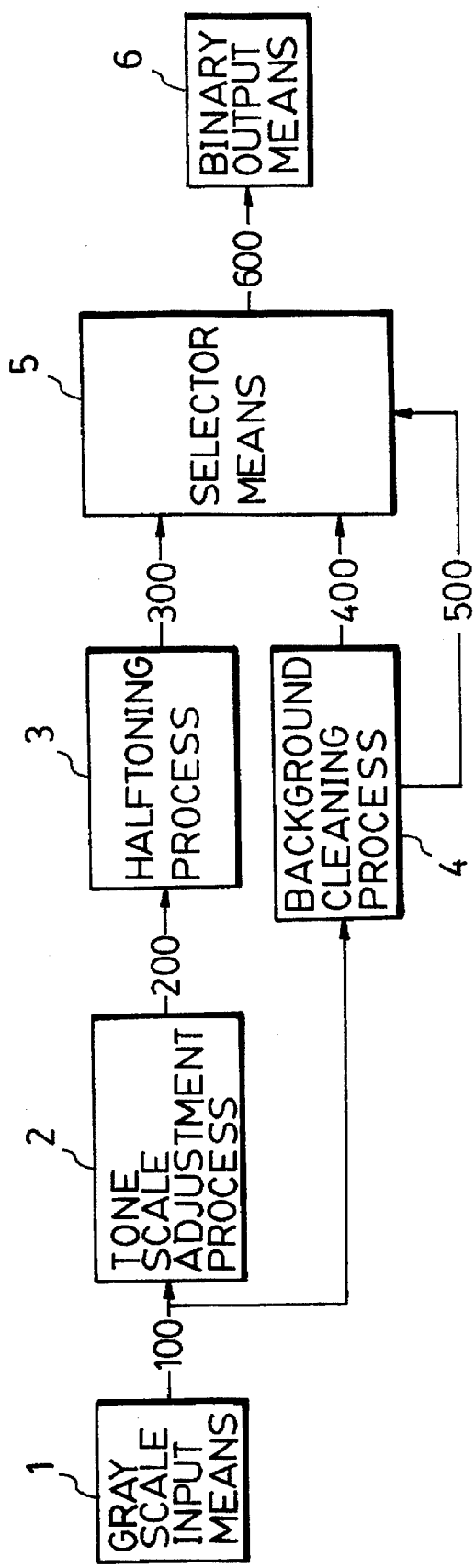
FIG. 1 is a schematic system block diagram of the present invention.

With reference to the drawings and in particular to FIG. 1 thereof, wherein the system block diagram of the present invention is shown, an image is read by a gray scale input means 1, preferably a scanner, and then subsequentially processed by tone scale adjustment process 2 and halftoning process (which is error diffusion herein) 3. Meanwhile, the originally-scanned image, namely the original gray scale image, is also sent through a background cleaning means 4 to clear away the black noises on the white background. The background cleaning process 4 generates a signal indicating if a pixel is a white background pixel and a signal representing the background pixel, i.e. a blank. Selector means 5 is then used to determine if the result from the halftoning process 3 should be suppressed by the result from the background cleaning process 4, namely to determine if a currently-processed pixel should be a blank which constitutes part of the white background in accordance with the indication signal of the background cleaning process 4. Thereafter, the pixel is printed out with a binary output means 6, preferably a printer.

In the following, the tone scale function and the background correction process which are incorporated in the improved error diffusion method of the present invention will be described in detail.

Figure 2B:
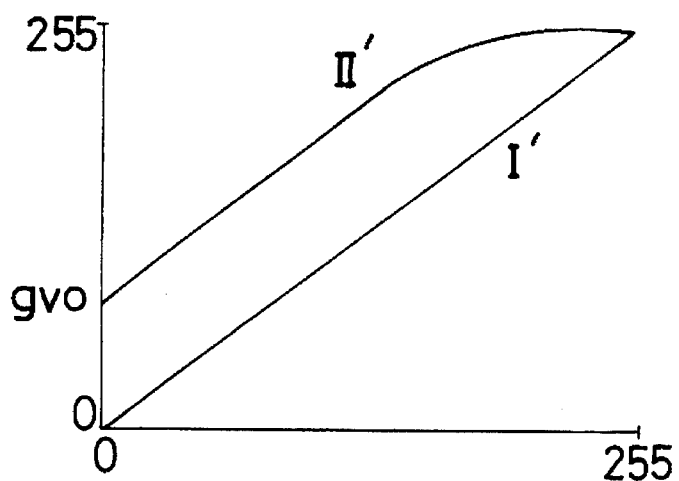
FIGS. 2a and 2b respectively show the relationships between the original gray level and the modified gray level proposed by conventional method and the present method.
Figure 2A:
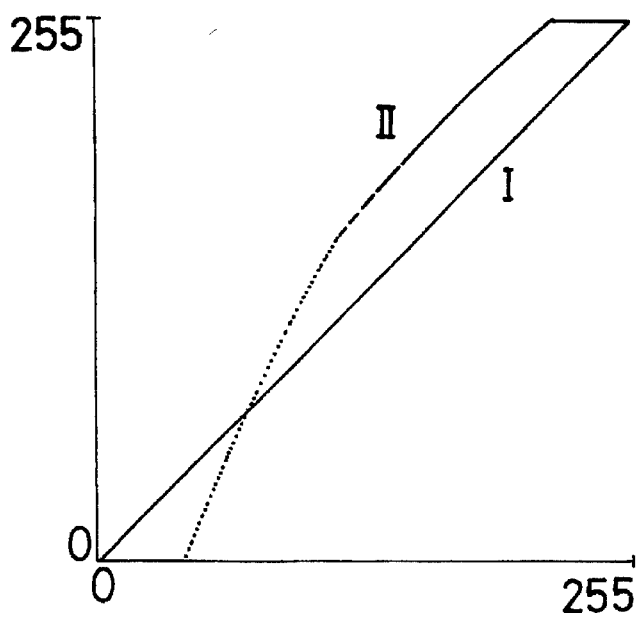

(1) TONE SCALE ADJUSTMENT FUNCTION:

A conventional tone scale adjustment method was first proposed by Robert Ulichney in his book "DIGITAL HALFTONING" (pp. 11-13). With particular reference to FIG. 2a wherein the abscissa of the plot indicates the original gray level and the ordinate is the gray level modified with the Ulichney's tone scale function, a non-modification curve I is shown in the plot for comparison with Ulichney's adjustment function which is shown by curve II. The adjustment suggested by Ulichney can enhance the contrast of the printed image, but not improving the darkening problem of the printing.

The darkening problem is resulted from the fact that human eyes cannot distinguish the minor difference between darker gray levels. Experiments show that if the tone scale between pure dark and pure white is divided into 256 gray levels, namely level 0 to level 255, and if these levels are respectively printed in a piece of white paper, then it is indistinguishable by human eyes for those gray levels lower than 70 which are generally considered pure dark by human eyes.

To address this problem, a tone scale function is adopted herein to convert the darker gray levels to brighter levels so as to help human eyes to discriminate the difference between these darker gray levels. The characteristic of this function is surely dependent upon the scan-in device and the printing device. In FIG. 2b, the tone scale function for images read with MICROTEK Scan Maker 600G scanner and printed by HP Laser Jet IIIp printer is shown as curve II'. A linear function I' is also shown in the figure which represents the non-modification curve for comparison.

It is shown in FIG. 2b that curve II' has a substantially linear portion in parallel with the non-modified curve I' in the lower level section and gradually bent to join the non-modified curve I' at the highest gray level 255. The linear portion of curve II' heightens the original gray levels of this section to a higher value and thus brightening the darker, substantially non-distinguishable portion. The original gray levels with a numerical value lower than 70 are increased an amount of 70 so that the original 0-255 gray levels are converted into 70-255 gray levels. Although the number of the gray levels is lesser, the resulted image is not affected, particularly for human eyes, for as mentioned previously, gray levels with a value lower than 70 are considered pure dark by human eyes.

In mathematic form, the tone scale function adopted by the present invention is expressed as follows:

$$g_1 = \text{ROUND}[g_{v0} + g_0 \times (g_{v1} - g_{v0}) \times a_1/((g_{a1} - g_{a0}) \times b_1)]$$

$$\text{if } g_0 \leq (g_{a1} - g_{a0}) \times b_1$$

and $$g_1 = \text{ROUND}[g_{v1} + (g_0 - g_{a1}) \times (g_{v1} - g_{v0}) \times a_2/((g_{a1} - g_{a0}) \times b_2)]$$

$$\text{if } g_0 > (g_{a1} - g_{a0}) \times b_1$$

wherein ROUND[ ] is rounding off by neglecting numerical value less than 0.5, $g_0$ is the original gray level, $g_1$ is the new gray level adjusted by the tone scale function, $g_{v0}$ is the lowest gray level that can be distinguished by human eyes, $g_{v1}$ is the highest gray level that can be distinguished by human eyes, $g_{a0}$ is the lowest gray level that might be digitized by a scanner, $g_{a1}$ is the highest gray level that might be digitized by a scanner, and $a_1$, $a_2$, $b_1$ and $b_2$ are adjusting factors and usually, $a_1+a_2=1$ and $b_1+b_2=1$.

(2) ERROR DIFFUSION CORRECTION PROCESS:

Documents which are processed by the error diffusion method generally contain noises on the white background. The background noises are caused by gray levels being mis-modified by cumulative error of successive diffusion steps. To clear these noises away from the printings, a correction method is provided by the present invention and will be described hereinafter.

Figure 3A:
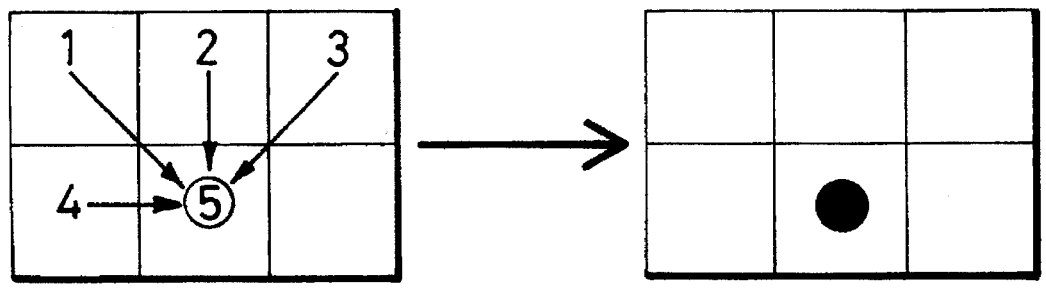
FIGS. 3a and 3b respectively schematically show how a noise dot is generated in the conventional method and how the noise dot is suppressed by the present method.
Figure 3B:
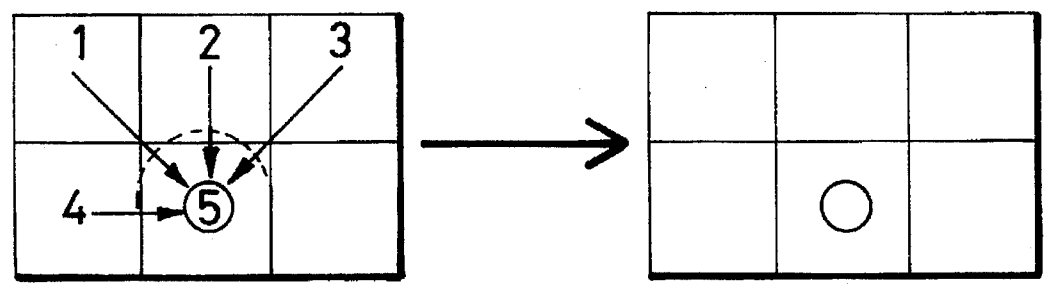

The correction method comprises a step of checking if the original gray level of the currently-processed pixel is a blank and if so, use a blank as the output instead of using the result from the halftoning process. This corrects the mis-modified result coming from the cumulative processing error of the error diffusion process. By comparison of FIGS. 3a and 3b, the operation principle of the present correction method can be more clearly illustrated. In FIG. 3a, the gray level of a background pixel, pixel 5, which was originally a blank becomes a black due to the errors diffused from the related neighboring pixels. The term "related neighboring pixels" as used herein refers to pixels of which the error between the original gray level value (which is usually a number between 0 and 1, inclusively) and modified gray level value (which is usually 1 or 0) will be diffused to the particular pixel. By using Floyd and Steinberg's model, the related neighboring pixels are pixels 1, 2, 3 and 4 shown in FIGS. 3a and 3b while pixel 5 is the pixel in discussion. This can be imaged from the error diffusion algorithm discussed in the BACKGROUND OF THE INVENTION section. Since the influence of the error of a pixel will be spread out through the whole image, the cumulative value of a blank pixel may eventually become smaller than the binarization threshold and thus turning the blank pixel into a black dot pixel. This is what illustrated in FIG. 3a. While in FIG. 3b, the correction method of the present invention suppresses the affection from neighboring pixels 1, 2, 3 and 4 by comparing with the original gray level. If the original gray level indicates that the pixel is a background pixel, then the result obtained from the error diffusion process is discarded and the gray level of a blank pixel will be used instead.

A white minimum threshold value must be set in order to determine if a pixel is a white dot of background from the original gray level thereof. If the gray level of a pixel is greater than this threshold value, then it is considered a white dot and will be printed as a white dot regardless the result generated by the error diffusion process. If not, the result from the error diffusion process will be printed. In this way, the result obtained from the error diffusion method can be corrected to eliminate the background noises with the provision of the white minimum threshold value. Nevertheless, it is very difficult to set a white minimum threshold value which satisfies all kinds of paper. An illustrative manner to determine a universal white minimum threshold value is by scanning as large number of different kinds of paper as possible to obtain the distribution of gray levels of the white dots of these different kinds of paper. A suitable value is then picked up from these gray levels of different kinds of paper as the universal white minimum threshold, which might be the least value obtained within three standard deviations of the statistical distribution of the white background gray level values. Once the white minimum threshold is determined, the correction process described above can then be applied to suppress the generation of the background noises. This is of particular importance in processing documents containing only text.

A preferred embodiment of the present invention is demonstrated in FIG. 1 wherein an image 100 which contains a plurality of pixels is read from the scanner 1. The image data are then processed by the tone scale adjusting process 2, usually with a look-up table obtained from the tone scale function, to generate the intermediate image data 200. The data 200 are further processed by the halftoning process 3, which is error diffusion in this embodiment, to provide a first output signal 300 which carries the information provided by the error diffusion process 3. This first output signal 300 will be sent to the selector means 5.

Meanwhile, the image 100 is also sent from the scanner 1 to the background cleaning means 4 to generate a signal for clearing away the background noises which might be generated in the halftoning process 3. The background cleaning means 4 generates a second signal 500 to indicate if a pixel of the original image 100 belongs to a white background from the original gray level of the pixel. For example, when the pixel is a white background pixel, then the signal 500 has a value of "1", otherwise signal 500 is "0". The background cleaning means 4 also provides a third signal 400 having the contents of a white dot when the second signal 500 is "1". Once the second signal 500 indicates that a pixel is a white background pixel, then the selector means 5 will use the third signal 400 to substitute the first signal 300 generated by the error diffusion process 3. The selector means 5 transmits a final output signal 600 which may be the first signal 300 or the third signal 400, depending upon the contents of the second signal 500, to the binary output device 6.

The present invention provides an important concept that the processes of halftoning and background cleaning are conducted simultaneously, namely in a parallel fashion. In other words, these two jobs are done at the same time and each pixel of an image is subjected to both processings and the final result is up to the decision of the selector means 5. This is very important to the error diffusion method, for the error diffusion method is essentially a sequential processing algorithm, wherein the result of each step is affected by the error generated previously and the error of the present step will inevitably affect the result of the next steps. If the process of error diffusion is externally interrupted or stopped or the intermediate result thereof is forced to change in order to, for example, reduce or change the error accumulation thereof, the smoothness of the final result thereof will generally be sacrificed. The present invention provides an algorithm which processes the image with two different ways but in a parallel fashion so that the background noises can be eliminated without sacrificing the smoothness of the final result.

Figure 4:
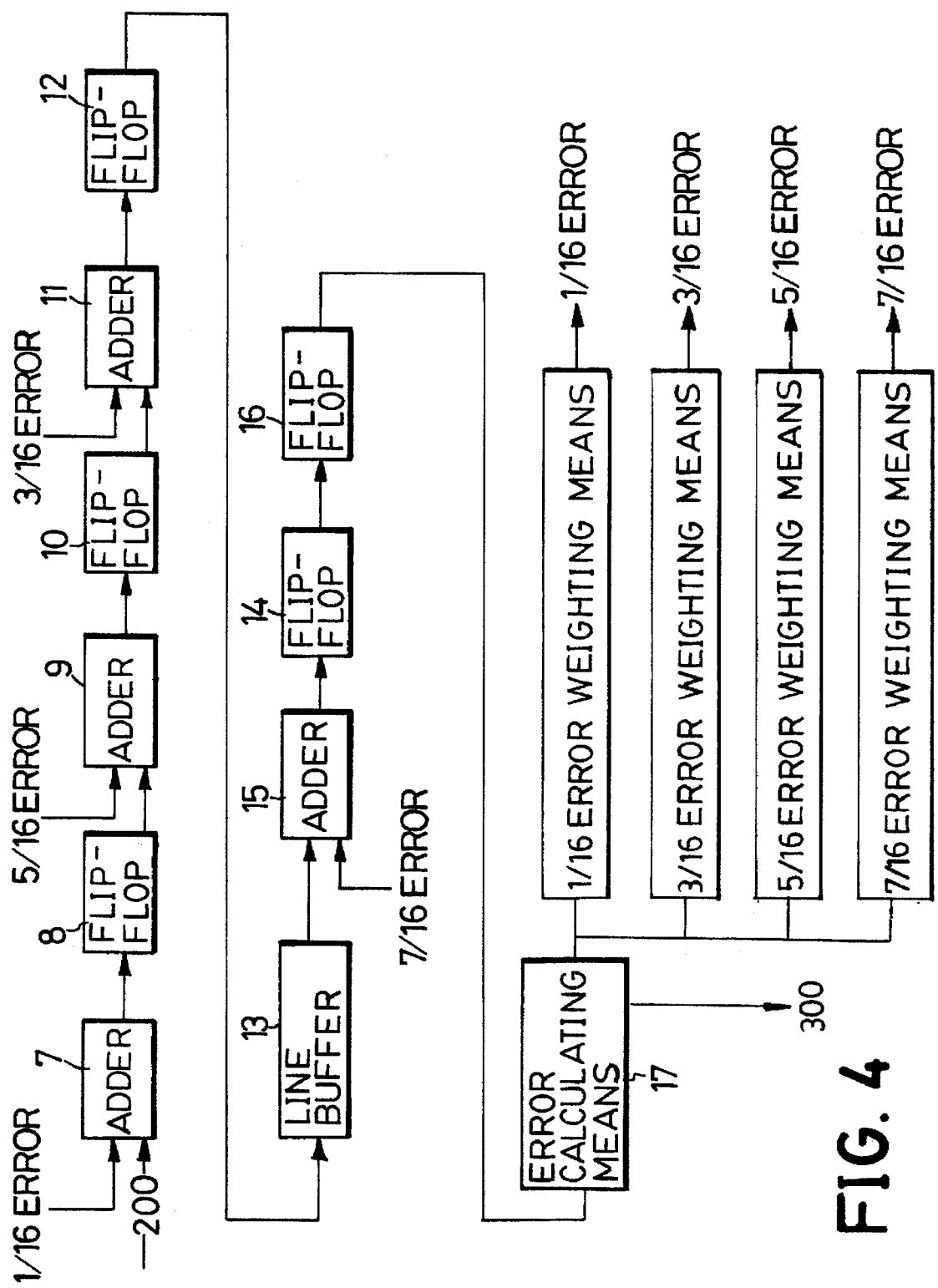
FIG. 4 is a schematic block diagram of the improved error diffusion method in accordance with the present invention.
Figure 5:
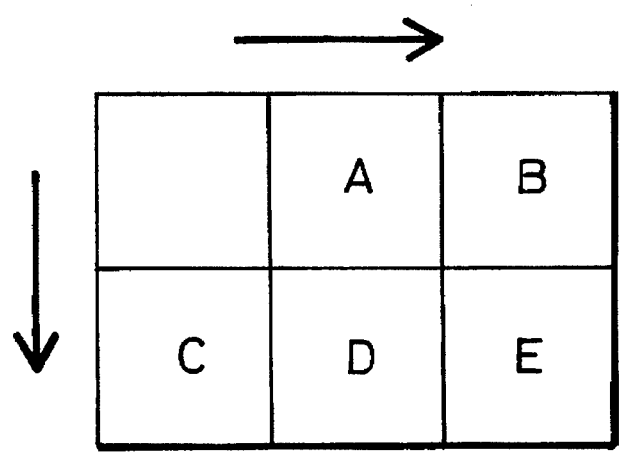
FIG. 5 shows the relationship between an image pixel and its neighboring pixels.

The block diagram of the error diffusion method is shown in FIG. 4 and the pixels that have been processed with the tone scale function are arranged as A, B, C, D and E of FIG. 5, pixel A being the currently-processed pixel and pixels B, C, D and E are the pixels which receive error diffused from pixel A. These are respectively stored in flip-flops 16, 14, 12, 10 and 8. The currently-processed pixel, pixel A, is stored in flip-flop 16 and the error thereof is calculated by an error calculating means 17. The calculated error is then multiplied by weighting factors $1/16$, $3/16$, $5/16$ and $7/16$ which are stored in the memory means designated by 18, 19, 20 and 21. The products are then respectively added to the flip-flops 8, 10, 12 and 14 via adders 7, 9, 11 and 15. Line buffer 13 is used to delay the image pixels by one line. On the other hand, the error calculating means 17 also provides the modified image pixel 300.

Figure 6:
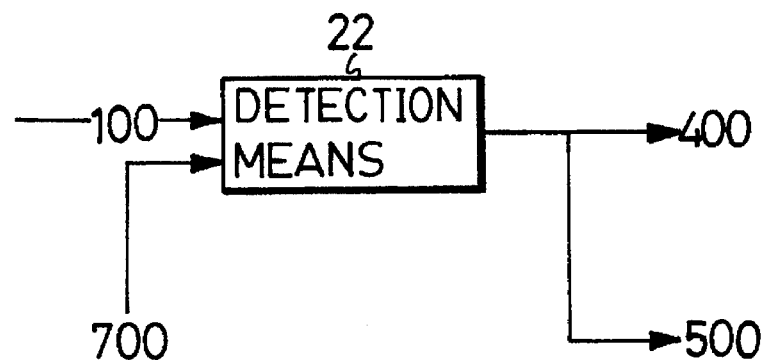
FIG. 6 is a block diagram of the present invention in eliminating the white background noises.

In FIG. 6, the block diagram of the background cleaning means 4 is shown. The original image 100 is fed to a detection means 22. A threshold 700, which represents the lowest gray level value that is considered a white dot, is also sent to the detection means 22 to serve as a comparison reference. If a pixel which is fed to the detection means 22 has a gray level greater than the threshold 700, then a white dot is generated as the third signal 400 and the second signal 500 is set to "1". If the gray level of the pixel is lower than the comparison reference 700, then the second output signal 500 is set to "0", indicating that the pixel does not belong to the white background.

Experiments are conducted to show the advantages of the present invention. In these experiments, the tested sample document is IEEE Std 167A-1987 FACSIMILE TEST CHART. The scan-in device is MICROTEK Scan Maker 600G scanner having a 300 dpi resolution and each scanned pixel is stored with 8 bits which gives 256 (0–255) gray levels. The host machine for doing the processing is YWC 486. The output device is HP Laser Jet IIIp with a resolution of 300 dpi.

Figure 7A:
FIGS. 7a and 7b respectively show a graphic output printed with the convention error diffusion method and the improved error diffusion method of the present invention.

In FIGS. 7a and 8a, graphic and text outputs obtained with the conventional method are respectively shown for comparison with the same documents obtained with the present invention. It can be observed that there are noises on the background of the text output and that the graphic output is slightly too dark for human eyes to distinguish the details of the photo.

Figure 7B:

In FIGS. 7b and 8b, similar documents processed with the present invention are shown. It can be observed by comparison with FIGS. 7a and 8a that the graphic output of FIG. 7b is much brighter than that of FIG. 7a and thus more easy for human eyes to distinguish the details of the printed material. It can also be found that the background noises which occur on FIG. 8a are completely erased in FIG. 8b which is obtained with the present invention.

Figure 9:
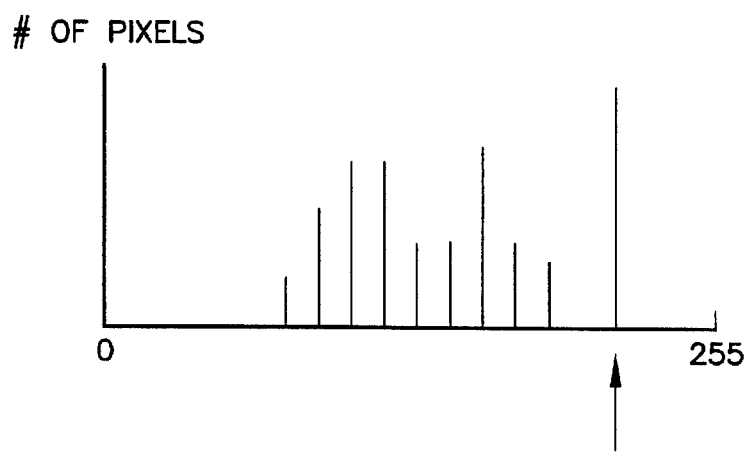
FIG. 9 is a histogram of an input image.
Figure 10:
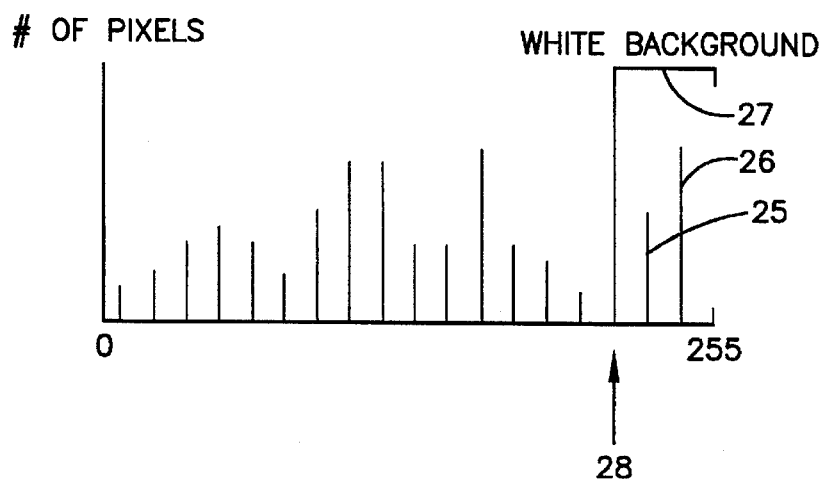
FIG. 10 is a histogram of an input image.
Figure 11:
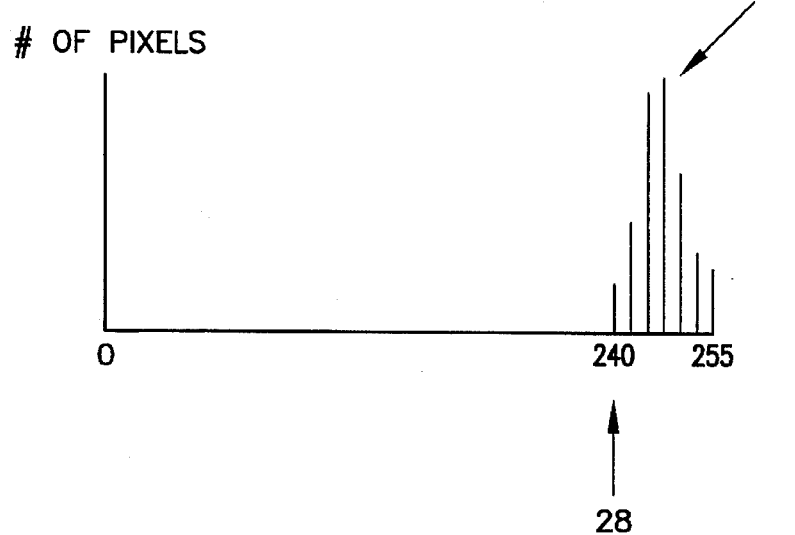
FIG. 11 is a composite histogram of several sheets of white paper.

FIGS. 9, 10 and 11 show the application of the present invention in various exemplary situations. For example, in FIG. 9, the histogram shows that there are no pixels which are "white". Consequently, in this instance, the application of the method does not result in background cleaning because there are no white pixels. This instance should be contrasted to the histogram shown as FIG. 10, in which histogram peaks 25 and 26 represent a distribution white pixels in the image. By application of the thresholding function as threshold 28, only white background pixels in the range 27 are forced to the white state.

FIG. 11 represents a histogram taken from multiple sheets of white paper, showing a distribution in their "whiteness" represented by the histogram peaks 29. It is generally believed that this distribution follows the Normal Distribution, and it is preferred to select as the white background threshold 28 a value which encompasses substantially all of the white pixels, which may be represented statistically as three standard deviations away from the mean.

An advantage of the present invention is its simpleness and can be easily implemented as hardware in a laser printer or a facsimile machine without a considerable increase in cost and the algorithm of the present invention is very efficient in processing documents containing both text and graphics.

It is apparent that although the invention has been described in connection with a preferred embodiment, those skilled in the art may make changes to certain features of the preferred embodiment without departing from the spirit and scope of the invention as defined in the appended claims.

What is claimed is:

1. A parallel-architecture halftoning method for improving the print quality of facsimile documents, comprising the steps of:

(a) inputting gray-level pixels of said document;

(b) adjusting the gray values of said gray-level pixels from step (a) to desired gray values;

(c) converting said gray-level pixels adjusted in step (b) into black-white pixels, creating current-processed pixels which give the illusion of gray by means of appropriate arrangement of black and white dots, and producing a first signal which represents the halftone processing result of the current-processed pixel;

(d) comparing the gray value inputted from step (a) of said current-processed pixel with a background threshold to detect whether said current-processed pixel belongs to the background or not, generating a second signal to indicate said detection, and producing a third signal which represents the output state of said current-processed pixel;

(e) selecting said first signal from step (c) or said third signal from step (d) in accordance with said second signal;

(f) printing out the selected signal from step (e) to result in one of a black dot and a white dot; and wherein said background threshold in said step (d) is determined by scanning a variety of white papers via said step (a) and selecting a least value as said background threshold.

2. A parallel-architecture halftoning system for improving the print quality of facsimile documents, comprising:

(a) gray-scale scan-in means for inputting gray-level pixels of said document;

(b) tone-scale adjusting means for adjusting the gray values of said gray-level pixels from said gray-scale scan-in means to desired gray values;

(c) halftone processing means for converting said gray-level pixels adjusted in said tone-scale adjusting means into black-white pixels, creating current-processed pixels which give the illusion of gray by means of appropriate arrangement of black and white dots, and producing a first signal which represents the halftone processing result of the current-processed pixel;

(d) background cleaning means for comparing the gray value inputted from said gray-scale scan-in means of said current-processed pixel with a background threshold to detect whether said current-processed pixel belongs to the background or not, generating a second signal to indicate said detection, and producing a third signal which represents the output state of said current-processed pixel;

(e) selector means for selecting said first signal from said halftone processing means or said third signal from said background cleaning means in accordance with said second signal;

(f) binary print-out means for printing out the selected signal from said selector means to result in one of a black dot and a white dot; and wherein said background threshold in said background cleaning means is determined by scanning a variety of white papers via said gray-scale scan-in means and selecting a least value as said background threshold.

3. A system for converting an input image into an output halftone image comprising:

a gray scale scanner for converting said input image into a gray scale input image and for generating a set of input image gray scale pixels; each of said input image gray scale pixels having a gray scale value between a white value and a black value;

a tone scale adjuster for nonlinearly altering the gray scale values of all input image gray scale pixels thereby generating a set of tone adjusted pixels;

an error diffusion halftone processor for converting each tone adjusted pixel into a binarized halftone pixel having a value of either white or black by the error diffusion process thereby generating a set of error diffusion pixels;

a threshold comparator for comparing each pixel in said set of error diffusion pixels with each corresponding pixel in said set of input image gray scale pixels and setting each pixel in said set of error diffusion pixels to white if the corresponding input image grey scale pixel is white, thereby generating a selected set of output pixels;

a binary printer for creating an output image from said selected set of output pixels;

wherein said tone scale adjuster increases the brightness of dark pixels.

4. A system for converting an input image into an output halftone image comprising:

a gray scale scanner for converting said input image into a gray scale input image and for generating a set of input image gray scale pixels; each of said input image gray scale pixels having a gray scale value between a white value and a black value;

a tone scale adjuster for nonlinearly altering the gray scale values of all input image gray scale pixels thereby generating a set of tone adjusted pixels;

an error diffusion halftone processor for converting each tone adjusted pixel into a binarized halftone pixel having a value of either white or black by the error diffusion process thereby generating a set of error diffusion pixels;

a threshold comparator for comparing each pixel in said set of error diffusion pixels with each corresponding pixel in said set of input image gray scale pixels and setting each pixel in said set of error diffusion pixels to white if the corresponding input image grey scale pixel is white, thereby generating a selected set of output pixels;

a binary printer for creating an output image from said selected set of output pixels; and wherein said tone scale adjuster increases the brightness of dark pixels and reduces the total range of output pixels producing a compressed tonal correction.

* * * * *

UNITED STATES PATENT AND TRADEMARK OFFICE
CERTIFICATE OF CORRECTION

PATENT NO. : 5,642,204

DATED : JUNE 24, 1997

INVENTOR(S) : WANG

It is certified that error appears in the above-identified patent and that said Letters Patent is hereby corrected as shown below:

Title page, Other Publications, line 7: "wahl" should read —Wahl—

Title page, Other Publications, line 9: "vol." should read —Vol.—

Signed and Sealed this

Twenty-fourth Day of November,1998

*Attest:*

BRUCE LEHMAN

*Attesting Officer*  *Commissioner of Patents and Trademarks*